(No Model.)

J. L. WILLIAMS.
INFUSING ATTACHMENT FOR TEA AND COFFEE POTS.

No. 264,590. Patented Sept. 19, 1882.

WITNESSES.
E. J. Haight
V. E. Coussen

INVENTOR.
James L. Williams
By his attorney
D. P. Kennedy

UNITED STATES PATENT OFFICE.

JAMES L. WILLIAMS, OF PORTLAND, OREGON, ASSIGNOR OF THREE-FOURTHS TO E. J. HAIGHT, L. M. COX, AND H. B. COURSEN, ALL OF SAME PLACE.

INFUSING ATTACHMENT FOR TEA AND COFFEE POTS.

SPECIFICATION forming part of Letters Patent No. 264,590, dated September 19, 1882.

Application filed October 24, 1881. (No model.)

*To all whom it may concern:*

Be it known that I, JAMES L. WILLIAMS, a resident of the city of Portland, Multnomah county, State of Oregon, have invented certain new and useful Improvements in Infusing Attachments for Tea and Coffee Pots, of which the following is a specification.

My invention relates to that class of utensils which are provided with a separate apparatus for the infusion of tea, coffee, or other ingredient; and the object of my invention is to construct a utensil for that purpose which will filter the water before it reaches the coffee or tea, and which will by its operation effect a thorough and complete extraction of the natural essence of the ingredient used, and this I accomplish by an arrangement of infusers attached to a common tea or coffee pot, fitted together so as to be air-tight when the infusing process is in operation.

Figure 1:
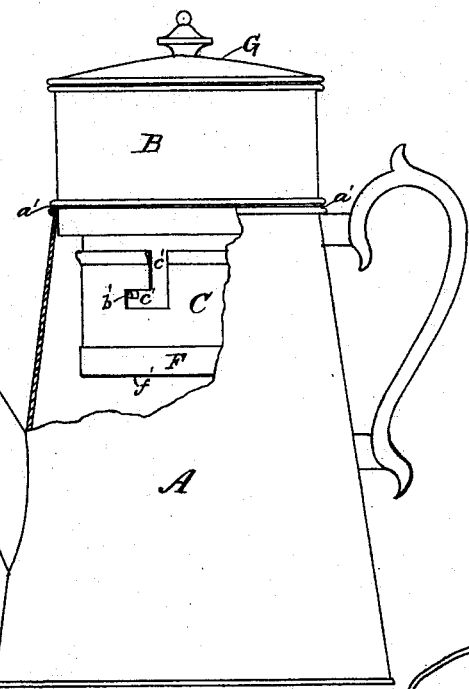
Figure 2:
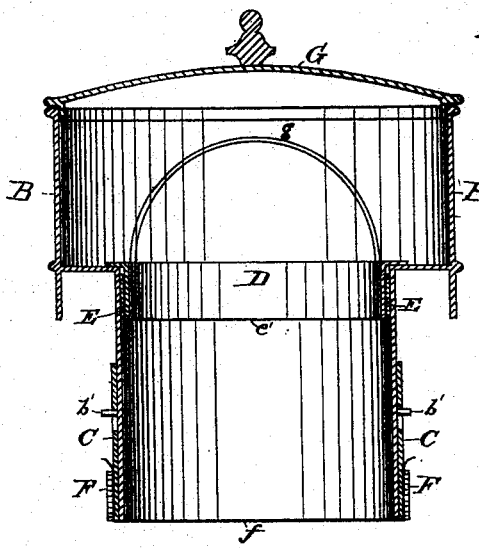
Figure 4:
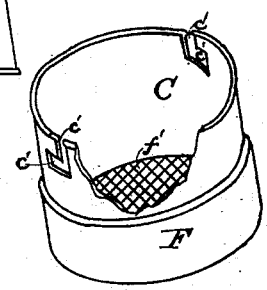
Figure 3:
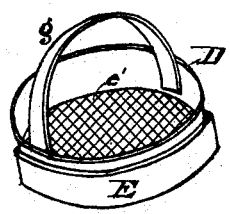

In the accompanying drawings, forming part of this specification, Figure 1 is a view in perspective of a coffee or tea pot with the infusing attachment therein. Fig. 2 is a view in vertical section of the infusing attachment by itself. Fig. 3 is a perspective view of the upper sieve, and Fig. 4 is a perspective view of the lower sieve.

A is a coffee or tea pot.

B is the upper part of the infuser, which fits snugly inside of the upper part of the tea or coffee pot A at $a'$ $a'$ and extends down into the pot a suitable distance.

C is a sleeve adapted to fit snugly over the lower open end of the part or vessel B. This sleeve or frame is provided at its top with two L-shaped slots, $c'$, which, engaging the lugs $b'$ projecting from the exterior of the vessel B, lock the parts together, after the manner of a bayonet-joint.

D is an upper sieve in part B.

$e'$ is the flat cloth bottom of the sieve D, and E is a retaining and adjustable hoop which holds cloth bottom $e'$ in place.

$f'$ is another flat cloth bottom in the part C of infuser, and F is the adjustable hoop which holds flat cloth bottom $f'$ in place; and G is the lid of the coffee-pot, which is put on the infuser when the operation of making tea or coffee is being performed. When that operation is completed and the infuser taken out of the pot, lid G is put on the coffee or tea pot proper.

The operation of my invention is as follows: The detachable sieve D is removed by taking hold of handle $g$, and the tea, coffee, or other ingredient is placed in the lower part of infuser C, resting on flat cloth bottom $f'$. Sieve D is then replaced, and about one-third of the quantity of hot water required is then poured into upper part, B, of infuser, and the lid G is then put on quickly. Sieve D is for the purpose of preventing any foreign matter or impurities which may be in the water from passing into the part C. When the proper length of time to allow the extraction of the natural essence of the tea, coffee, or other ingredient by the action of the hot water has elapsed, remove the infuser from the pot, put the lid G on the pot, and the same is ready for use. About half a minute will be sufficient time for the infusing operation. More water may then be added as required.

By the use of the apparatus described, and in having all parts thereof fitting snugly, the entire natural essence and aroma of the ingredient used will be preserved and retained in the utensil used.

The necessary cleaning of the infuser is done by detaching the parts B and C and throwing out the grounds, when they can be cleaned by holding under a hydrant and pouring water on the parts.

When the cloth bottoms $e'$ and $f'$ become worn out or dirty they can be replaced by any one and at little expense, the adjustable retaining-hoops being handy and convenient for this purpose.

The advantages which I claim for my invention are that it is convenient, simple, and effective especially as to the arrangement of flat cloth bottoms and retaining-hoops. The infusers can be made in assorted sizes to fit any size of coffee or tea pot.

I am aware that coffee-pots have been provided with an infuser having straining-cloths held on by rings, some of which are placed upon the outside and others upon the inside of the infusers. I am also aware that infusers have been made of two sections attached together by a bayonet-joint, each section having a strainer, and the upper strainer joined to the top of the pot, which is provided with a water-tank of nearly the same diameter as and opening on the strainer in the upper section. This device is defective for the reason that the tank must be very high, and nearly the whole weight of the water will rest upon the coffee in the infuser, causing the former to percolate fasten than the essence can be extracted. I obviate these defects by making the water-tank serve as the top of the pot, and provide it with a small opening in the middle for the filtering-strainer. The tank also serves as a top and condenser—objects not sought in the device above referred to.

Having described my invention, what I claim as new, and desire to secure by Letters Patent, is—

1. In a coffee-pot, the combination, substantially as before set forth, with an infuser or coffee-containing vessel consisting of a cylinder pendent from the top, of a filtering-strainer formed of two rings and a cloth clamped between the rings and held in the top of the cylinder by a flange upon one of the rings, and of a strainer-bottom formed of two rings and a cloth clamped between said rings and attached to the cylinder by a bayonet-joint, substantially as shown, and for the purpose set forth.

2. In a coffee-pot, the combination, substantially as before set forth, with an infuser and condenser consisting of a chamber of the same diameter as and forming the top of the pot, of a cylinder of less diameter than and pendent from the bottom of the chamber, and provided with removable strainer at top and bottom.

JAMES L. WILLIAMS.

Witnesses:
E. A. COURSEN,
D. P. KENNEDY.